(12) United States Patent
Hoyes et al.

(10) Patent No.: US 6,318,732 B1
(45) Date of Patent: Nov. 20, 2001

(54) GASKET

(75) Inventors: John Robert Hoyes, Littleborough; Anthony Russel Currie, Barnby Dun; Peter George Mowvley, West Yorkshire; Alan William Atkinson, Nr. Rugby; Stephen Peter Bond, Rugby, all of (GB)

(73) Assignee: Flexitallic Investments, Inc., Houston, TX (US)

( * ) Notice: Subject to any disclaimer, the term of this patent is extended or adjusted under 35 U.S.C. 154(b) by 0 days.

(21) Appl. No.: 09/242,417

(22) PCT Filed: Aug. 11, 1997

(86) PCT No.: PCT/GB97/02153

§ 371 Date: Jul. 9, 1999

§ 102(e) Date: Jul. 9, 1999

(87) PCT Pub. No.: WO98/09100

PCT Pub. Date: Mar. 5, 1998

(30) Foreign Application Priority Data

Aug. 29, 1996 (GB) .................................................. 9618010
Aug. 29, 1996 (GB) .................................................. 9618061

(51) Int. Cl.[7] .................................................. F16J 15/12
(52) U.S. Cl. .................. 277/593; 277/595; 277/612; 277/647; 277/649
(58) Field of Search ................................. 277/592, 652, 277/938, 595, 612, 593, 626, 647, 649

(56) References Cited

U.S. PATENT DOCUMENTS

| | | | | |
|---|---|---|---|---|
| 3,239,245 | * | 3/1966 | Press | 277/593 |
| 3,378,269 | * | 4/1968 | Castor | 277/595 |
| 4,850,521 | * | 7/1989 | Servant | 277/595 |

FOREIGN PATENT DOCUMENTS

| | | |
|---|---|---|
| 0773392 | 5/1997 | (EP) . |
| 2031924 | 11/1970 | (FR) . |
| 1124145 | 8/1968 | (GB) . |
| 2251274 | 7/1992 | (GB) . |

* cited by examiner

Primary Examiner—Anthony Knight
Assistant Examiner—Enoch Peavey
(74) Attorney, Agent, or Firm—John W. Montgomery; Haynes and Boone, L.L.P.

(57) ABSTRACT

A gasket (10) comprises a first sealing member (12) and a second sealing member (14) both made of springy metal, and a clamping member (16) which holds the first and the second sealing members in an overlying relationship. The first sealing member (12) has an arm portion (12a) projecting from the clamping member (16), the arm portion being adapted to resiliently form a seal with a first body. The second sealing member (14) has an arm portion projecting from the clamping member (16), the arm portion being adapted to resiliently form a seal with a second body. A compression limiting stop (16e) is provided.

28 Claims, 1 Drawing Sheet

GASKET

Figure 1:
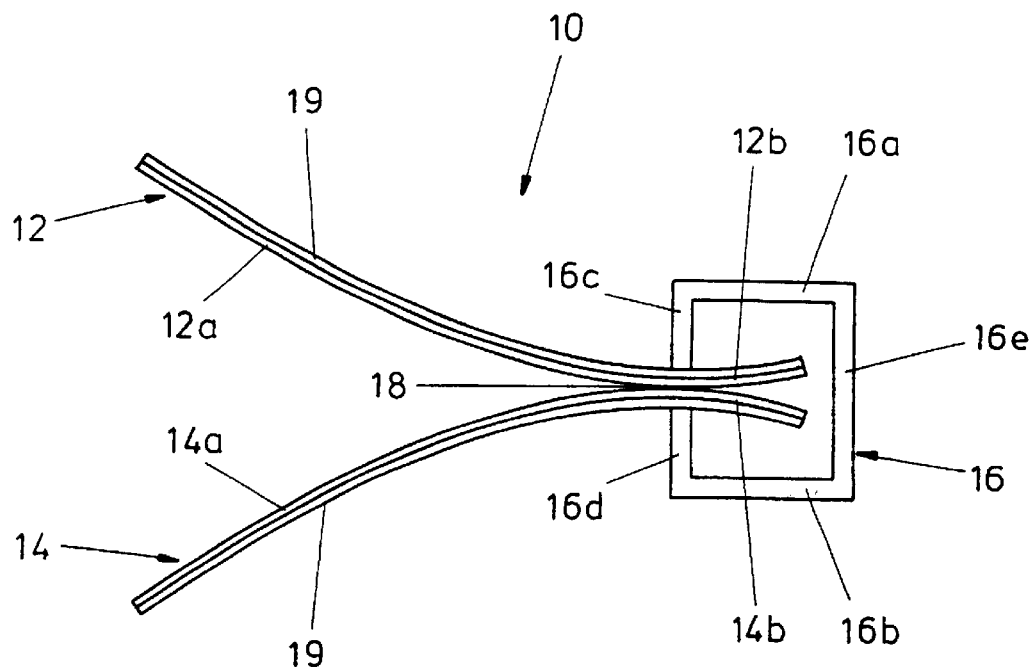

This invention is concerned with a gasket of the type which is adapted when clamped between two bodies to seal the gap between the bodies around a chamber or passage jointly defined by the bodies. Such a gasket may be used, for example, for sealing the gap between flanges at the ends of pipes. The present invention is also concerned with two bodies that incorporate a gasket and a method of sealing two bodies with a gasket.

Gaskets require to be resilient in order to achieve a seal. In some gaskets, the resilience is achieved by using inherently resilient material such as rubber or cork and, in other gaskets, the resilience is achieved by utilising springy metal which resists being bent out of its initial shape. This invention is concerned with the latter type of gasket which comprises a sealing member which forms a closed loop extending around a hole which corresponds to the chamber or passage. Such gaskets are often in the shape of an annular ring but may have other shapes. Accordingly, the term "ring" is used herein to include a continuous band surrounding a hole of any shape.

Known gaskets made of springy metal have sealing members which have generally C or V-shaped transverse cross-sections (see U.S. Pat. No. 4,877,272 for a V-shaped cross-section). The cross-section comprises two arms which project either inwardly or outwardly of the hole, the arms being adapted to each resiliently engage one of the bodies to form a seal around said hole. In this type of gasket, the sealing force is achieved by deformation of a single piece of metal which bends sharply between its lines of engagement with the bodies against which the gasket seals. Because the single piece of metal has to bend sharply, there is a danger that cracking may occur when the clamping force is applied.

GB 1 041 181 (BTR) and GB 1 434 492 (Ford) describe annular gaskets that form a seal between two bodies. When the bodies are tightened to their limit the annular gaskets, which previously comprised springy arms spaced from each other, are clamped together tightly along their complete co-extent to form parallel arms that abut the bodies and abut each other. Thus when the bodies go from being spaced apart from their limit position to the limit position the seal provided goes from being a substantially linear seal around the bodies to a seal which has an extent radially outwardly of the bodies over the co-extent of the bodies and the arms.

In the limit position the arms may have been bent beyond their useful working range where the spring force of the arms exerts an optimum sealing pressure on the bodies. Alternatively or additionally, to keep the arms operating in their optimum range, the bodies will have to initially engage the arms at a position where the bodies are extremely close together. In the limit position the force exerted on the springy arms may be such that the arms crack when the clamping force is applied or when an excessive clamping force is applied. Furthermore, the seal provided by the arms contacting each other along their complete co-extent is not as satisfactory as a substantially linear contact where the arms remain spaced apart. In addition, in the limit position where the arms are in contact, the pressure of fluid in the two bodies can not urge the parts into further sealing engagement with each other.

It is an object of the present invention to attempt to overcome at least some of the above described disadvantages.

It is another object of the present invention to provide a gasket in which spring metal is used to provide the sealing force, the gasket having a reduced risk of cracking.

According to one aspect of the present invention in a gasket adapted when clamped between two bodies around a chamber or passage jointly defined by the bodies, the gasket forms a ring extending around a hole which corresponds to the chamber or passage, the gasket comprises a first sealing member and a second sealing member both made of springy metal, and a compression limiting stop, the first sealing member having an arm portion projecting from the compression limiting stop, the arm portion of the first sealing member being adapted to resiliently engage one of said bodies to form a seal therewith at a location spaced from the stop, and the second sealing member having an arm portion projecting from the stop, the arm portion of the second sealing member being adapted to resiliently engage the other of said bodies to form a seal therewith at a location spaced from the stop, the first and second sealing members being arranged to resiliently engage their respective bodies to form a seal therewith at a location spaced from the compression limiting stop when both of the bodies engage the stop.

The first and second sealing members may be arranged to be spaced from each other at the location that they sealingly engage their respective bodies when both of the bodies engage the stop.

The free ends of each arm may be arranged to resiliently engage their respective bodies to form a resilient seal therewith.

A location spaced from the ends of the arms may be arranged to engage the respective bodies to form a resilient seal therewith.

A clamping member may be arranged to hold the first and second sealing members in an overlying relationship. The clamping member can be made of thicker material which can resist cracking better than a springy metal. The clamping member may comprise the compression limiting stop. The clamping member may press said first and said second sealing members together so that a seal is formed between them. The clamping member may be formed from sheet metal and have a generally C-shaped transverse cross-section comprising two legs between which the sealing members are received, the legs engaging the sealing members.

The compression limiting stop may be arranged to transmit forces between the bodies, when both bodies engage the stop, through a portion that is separate from the first and second sealing members.

The first and second sealing members may be welded together.

The compression limiting stop may comprise a first member adapted to extend around a hole which corresponds to the chamber or passage arranged to engage one of the bodies and a second member adapted to extend around a hole which corresponds to the chamber or passage arranged to engage the other of the bodies. The first and second members may be spaced from each other. The first and second sealing members may extend at least partially through the first and second members of the compression limiting stop. The first and second members of the compression limiting stop may be welded to the first and second sealing members.

The pressure of fluid within a chamber of passage may be arranged to bias the arm portions further into engagement with their respective bodies to further enhance the sealing effect of the gasket, and may enhance that sealing effect even when the bodies engage the compression limiting stop.

A first sealing means comprising the first and second sealing members may extend inwardly of the compression limiting stop and second sealing means also comprising first and second sealing members as claimed in any preceding claim may extend outwardly of the compression limiting stop.

According to another aspect of the present invention in two bodies that incorporate a gasket clamped between them to seal the gap between the bodies around a chamber or passage jointly defined by the bodies, the gasket forms a ring extending around a hole which corresponds to the chamber or passage, wherein the gasket comprises a first sealing member and a second sealing member both made of springy metal, and a compression limiting stop, the first sealing member having an arm portion projecting from the compression limiting stop, the arm portion of the first sealing member resiliently engaging one of the bodies to form a seal therewith at a location spaced from the stop, the second sealing member having an arm portion projecting from the stop, the arm portion of the second sealing member resiliently engaging the other of the bodies to form a seal therewith at a location spaced from the stop, the first and second sealing members resiliently engaging their respective bodies to form a seal therewith at a location spaced from the compression limiting stop when both of the bodies engage the stop.

The pressure of fluid within the chamber or passage may urge the arm portions further into engagement with their respective bodies to further enhance the sealing effect of the gasket, and that sealing effect may be enhanced when the bodies engage the compression limiting stop.

According to a further aspect of the present invention a method of sealing two bodies with a gasket comprises clamping the gasket between the two bodies to seal the gap between the bodies around a chamber or passage jointly defined by the bodies, the gasket forming a ring extending around a hole which corresponds to the chamber or passage, the gasket comprising a first sealing member and a second sealing member both made of springy metal, and a compression limiting stop, the first sealing member having an arm portion projecting from the compression limiting stop, the arm portion of the first sealing member resiliently engaging one of the bodies to form a seal therewith at a location spaced from the stop, and the second sealing member having an arm portion projecting from the stop, the arm portion of the second sealing member resiliently engaging the other of the bodies to form a seal therewith at location spaced from the stop, the first and second sealing members being caused to resiliently engage their respective bodies to form a seal therewith at a location spaced from the compression limiting stop when both of the bodies are brought together to engage the stop.

The method may comprise the pressure of fluid within the chamber or passage urging the arms against their respective bodies to further enhance the sealing effect of the gasket and the arms may be so urged when the bodies engage the compression limiting stop.

Figure 2:
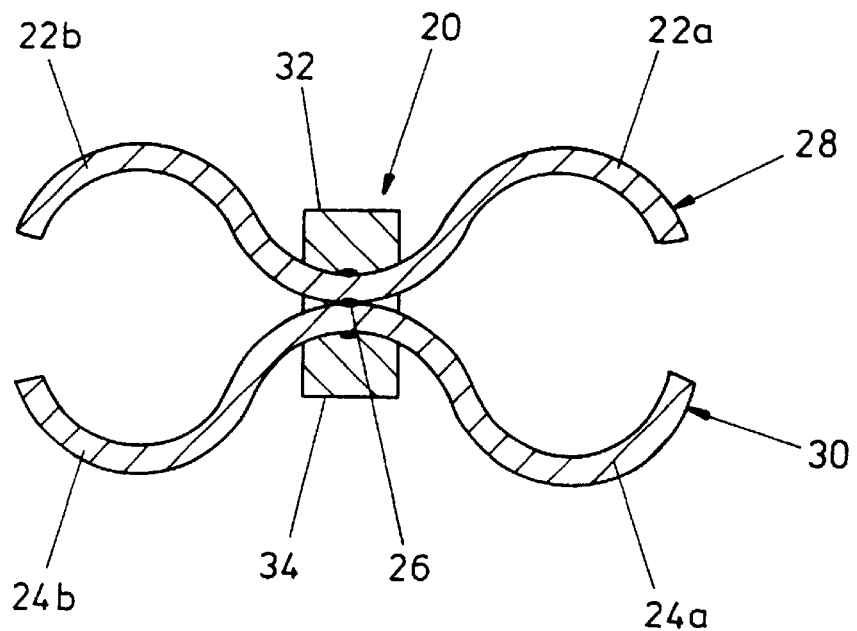

The present invention may be carried into practice in various ways but two embodiments will now be described by way of example and with reference to the accompanying drawings, in which:

FIG. 1 is a transverse cross-sectional view taken through one side of a first embodiment of a gasket, and FIG. 2 is a similar view to that of FIG. 1 of a second embodiment of a gasket.

The illustrative gasket 10 in FIG. 1 and 20 in FIG. 2 are adapted when clamped between two bodies (not shown) to seal the gap between the bodies around a chamber or passage defined by the bodies. For example, the gaskets may be utilised to seal around a fluid passage in pipes having flanges at their ends, the gaskets being received between the flanges which are then clamped together by bolts. The gaskets forms a ring extending around a hole which corresponds to the chamber or passage.

The gasket 10 in FIG. 1 comprises a first sealing member 12 and a second sealing member 14. The gasket 20 shown in FIG. 2 comprises a first sealing member 28 and a second sealing member 30. The sealing members 12, 14 and 28, 30 are made from springy metal in sheet form. The members 12, 14 and 28, 30 can be stamped out of sheet steel as a complete annulus or can be formed from strip steel which is bent into a loop and has its ends joined together by a weld. Although shown as of constant a thickness, the members may vary in thickness, this being achieved, eg, by machining. The gasket 10 also comprises a clamping member 16 which holds the first 12 and the second 14 sealing members in an overlying relationship.

As can be seen in FIG. 1, the first sealing member 12, in transverse cross-section, is generally arcuate, having a generally convex surface facing towards the member 14 and a concave surface facing away from the member 14. The second sealing member 14 has the same shape as the member 12 but is inverted relative thereto so that it has its convex surface facing towards the member 12 and its concave surface facing away therefrom. The first 12 and the second 14 sealing members engage one another along a line 18 at the lowest point of the member 12 and the highest point of the member 14.

The first sealing member 12 has a longer arm portion 12a projecting from the line 18 outwardly of the hole through the gasket and a shorter arm portion 12b projecting from the line 18 inwardly of said hole. The second sealing member 14 has a similar longer arm portion 14a and a similar shorter arm portion 14b. The arms 12a and 14a may vary in thickness, eg tapering to their thinnest at their free ends.

The clamping member 16 and is made of sheet metal which is substantially thicker than that forming the members 12 and 14. The clamping member 16 is generally c-shaped in transverse cross-section, comprising two legs 16a and 16b between which the shorter arm portions 12b and 14b of the sealing members are received. The legs 16a and 16b have lips 16c and 16d which are turned towards the sealing members 12 and 14, the lips being adapted to grip the sealing members and clamp them together. The clamping member 16 also comprises a joining portion 16e from which the legs 16a and 16b project. The joining portion 16e extends past the free ends of the shorter arm portions 12b and 14b. In this case, the joining portion 16e bounds the hole through the gasket 10. Since the joining portion 16e extends normally of the plane of the gasket 10, it is adapted to provide a compression-limiting stop to prevent excessive compression of the gasket, ie if excessive clamping force brings the bodies into contact with the clamping member 16, further compression is resisted by the portion 16e.

The longer arm portions 12a and 12b project away from the clamping member 16 in a direction which is radially outwards the hold through the gasket 10. The arm portion 12a is adapted so that its free end can resiliently engage one of the bodies between which the gasket 10 is clamped to form a seal therewith. The arm portion 14a is adapted so that its free end can resiliently engage the other of said bodies to form a seal therewith. Thus, the gasket 10 forms a seal with both of said bodies.

In order to improve the seals formed by the arm portions 12a and 14a and to form a seal between the lips 16c and 16d and the sealing members 12 and 14, the gasket 10 also comprises layers of deformable material 19, specifically expanded graphite, which are secured to the concave surfaces of the members 12 and 14. The layers 19, thus, extend into the areas in which the arm portions 12a and 14a engage the bodies and assist in sealing by filling small cracks or fissures in these areas. The layers 19 also pass through the areas where the lips 16c and 16d engage the members 12 and 14, respectively, and serve to improve the seal in these areas.

The gasket 20 shown in FIG. 2 is the same as the first illustrative gasket 10 except as hereinafter described. The gasket 20 has pieces 28 and 30 of constant thickness and a compression-limiting stop is provided in the central region adjacent to the joint 16 by stop pieces 32 and 34 which are welded to the pieces 28 and 30, respectively, in the dips between arms 22a and 22b, and 24a and 24b, respectively. The layers of deformable material may be included but are omitted form FIG. 2.

The members 28 and 30 sealingly engage the bodies with which they seal with at the convex arms 22a, 22b and 24a and 24c. In the limit position, the free ends of the arms are spaced from each other and the bodies are clamped against the stop pieces 32 and 34. The pieces 28 and 30 are welded together at 16.

The gaskets 10 and 20 provide a good seal without requiring metal sealing members to be sharply bent. Furthermore the springy parts remain spaced from each other in the limit position when the compression limiting stops are engaged to allow the seals to be provided at locations spaced from the stops.

In variations of the gaskets 10 and 20, layers of deformable material similar to the layers 19 are adhered to the outer surfaces of the legs 16a and 16 and/or to the convex surfaces of the sealing members 12 and 14. It is also possible to have the arm portions 12a and 14a projecting inwardly of the hole through the gasket, the clamping member 16 then facing the opposite way. This latter construction has the advantage that pressure of the fluid in the passage or chamber, around which the gasket seals, acts between the arm portions 12a and 14a and assists in urging them against the bodies.

In addition, as the arms of each gasket are made of springy metal, the pressure of fluid within the passage can exert a force on the arms to urge them outwardly into further sealing engagement with each body thereby enabling the gaskets to be self energising. This feature can be enhanced by designing the arms to have a certain, sufficient flexibility. The self energising feature can be present even when the bodies engage the stops.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A gasket adapted when clamped between a first body and a second body to seal the gap between the first and second bodies around a chamber or passage jointly defined by the bodies, the gasket forming a ring extending around a hole which corresponds to the chamber or passage, wherein the gasket comprises:

a first sealing member;

a second sealing member; and a compression limiting stop abutment; wherein the first sealing member having a first arm portion projecting from the compression limiting stop, the first arm portion of the first sealing member being adapted to resiliently engage the first body to form a seal therewith at a location spaced from the stop, the second sealing member having a second arm portion projecting from the compression limiting stop, the second arm portion of the second sealing member being adapted to resiliently engage the second body to form a seal therewith at a location spaced from the stop, and the first and second sealing members being resiliently arranged to engage the first and second bodies, respectively, to form a seal therewith at a location spaced from the compression limiting stop when the first and second bodies engage the stop characterized in that the first and second sealing members are both made of springy metal and in that a clamping member is arranged to hold the first and second sealing members in an overlying relationship.

2. The gasket as claimed in claim 1 wherein the first and second sealing members are arranged to be spaced from each other at the location that they sealingly engage the first and second bodies respectively when both of the bodies engage the stop.

3. The gasket as claimed in claim 2 wherein free ends of the first and second arms are arranged to resiliently engage the first and second bodies, respectively, to form a resilient seal therewith.

4. The gasket as claimed in claim 2 wherein a location spaced from ends of the first and second arms are arranged to engage the first and second bodies, respectively, to form a resilient seal therewith.

5. The gasket as claimed in claim 1 wherein free ends of the first and second arms are arranged to resiliently engage the first and second bodies, respectively, to form a resilient seal therewith.

6. The gasket as claimed in claim 1 wherein a location spaced from ends of the first and second arms are arranged to engage the first and second bodies, respectively, to form a resilient seal therewith.

7. The gasket as claimed in claim 1 wherein the clamping member comprises the compression limiting stop.

8. The gasket as claimed in claim 1 wherein the clamping member presses said first and said second sealing members together so that a seal is formed between them.

9. The gasket as claimed in claim 1 wherein the clamping member is formed from sheet metal and has a generally C-shaped transverse cross-section comprising two legs between which the sealing members are received, wherein the legs engage the sealing members.

10. The gasket as claimed in claim 1 herin the compression limiting stop is arranged to transmit forces between the first and second bodies, when the first and second bodies engage the stop, through a portion that is separate from the first and second sealing members.

11. The gasket as claimed in claim 1 wherein the first and second sealing members are welded together.

12. The gasket as claimed in claim 1 wherein the compression limiting stop comprises:
a first member adapted to extend around a hole which corresponds to the chamber or passage arranged to engage the first body; and
a second member adapted to extend around a hole which corresponds to the chamber or passage arranged to engage the second body.

13. The gasket as claimed in claim 11 wherein the first and second sealing members extend at least partially through a first member and a second member of the compression limiting stop.

14. The gasket as claimed in claim 13 wherein the first and second members of the compression limiting stop are welded to the first and second sealing members.

15. The gasket as claimed in claim 1 wherein the compression limiting stop comprises:
a first member adapted to extend around a hole which corresponds to the chamber or passage arranged to engage the first body; and
a second member adapted to extend around a hole which corresponds to the chamber or passage arranged to engage the second body.

16. The gasket as claimed in claim 15 wherein the first and second members are spaced from each other.

17. The gasket as claimed in claim 16 wherein the first and second sealing members extend at least partially through the first and second members of the compression limiting stop.

18. The gasket as claimed in claim 15 wherein the first and second members of the compression limiting stop are welded to the first and second sealing members.

19. The gasket as claimed in claim 1 wherein a pressure of fluid within the chamber or passage is arranged to bias the first and second arm portions further into engagement with the first and second bodies, respectively, to further enhance the sealing effect of the gasket.

20. The gasket as claimed in claim 19 wherein the pressure of fluid within the chamber or passage is arranged to bias the first and second arm portions further into engagement with the first and second bodies, respectively, to further enhance the sealing effect of the gasket when the first and second bodies engage the compression limiting stop.

21. The gasket as claimed in claim 1 further comprising:
a first sealing means comprising the first and second sealing members extending inwardly of the compression limiting stop; and
a second sealing means comprising the first and second sealing members extending outwardly of the compression limiting stop.

22. The gasket according to claim 1 wherein the gasket also comprises layers of deformable material which are secured to said first and second arm portions at least in areas thereof which engage the first and second bodies, respectively.

23. An embodiment comprising:
a first body;
a second body; and
a gasket clamped between the first and second bodies to seal the gap between the first and second bodies around a chamber or passage jointly defined by the first and second bodies, the gasket forming a ring extending around a hole which corresponds to the chamber or passage, wherein the gasket comprises,
a first sealing member,
a second sealing member, and
a compression limiting stop wherein,
the first sealing member has a first arm portion projecting from the compression limiting stop, the first arm portion of the first sealing member resiliently engaging the first body to form a seal therewith at a location spaced from the stop,
the second sealing member having a second arm portion projecting from the compression limiting stop, the second arm portion of the second sealing member resiliently engaging the second body to form a seal therewith at a location spaced from the stop, and
the first and second sealing members resiliently engaging the first and second bodies, respectively, to form a seal therewith at a location spaced from the compression limiting stop when the first and second bodies engage the stop characterized in that the first and second sealing members are both made of springy metal and in that a clamping member holds the first and second sealing members in an overlying relationship.

24. The embodiment as claimed in claim 23 wherein a pressure of fluid within the chamber or passage urges the first and second arm portions further into engagement with the first and second bodies, respectively, to further enhance the sealing effect of the gasket.

25. The embodiment as claimed in claim 24 wherein the pressure of fluid enhances the sealing effect of the gasket when both of the first and second bodies engage the compression limiting stop.

26. A method of sealing two bodies with a gasket comprising:
clamping the gasket between a first body and a second body to seal the gap between the first and second bodies around a chamber or passage jointly defined by the bodies; and
forming a ring with the gasket extending around a hole which corresponds to the chamber or passage, wherein the gasket comprises
a first sealing member,
a second sealing member, and
a compression limiting stop wherein,
the first sealing member having a first arm portion projecting from the compression limiting stop, the first arm portion of the first sealing member resiliently engaging the first body to form a seal therewith at a location spaced from the stop,
the second sealing member having a second arm portion projecting from the compression limiting stop, the second arm portion of the second sealing member resiliently engaging the second body to form a seal therewith at a location spaced from the stop, and
the first and second sealing members resiliently engaging the first and second bodies, respectively, to form a seal therewith at a location spaced from the compression limiting stop when the first and second bodies are brought together to engage the stop characterized in that the first and second sealing members are both made of springy metal and in that a clamping member holds the first and second sealing members in an overlying relationship.

27. The method of sealing two bodies with a gasket as claimed in claim 26 further comprising pressurizing a fluid within the chamber or passage to urge the first and second arms against the first and second bodies, respectively, to further enhance the sealing effect of the gasket.

28. A The method of sealing two bodies with a gasket as claimed in claim 27 further comprising pressurizing a fluid to urge the first and second arms against the first and second bodies, respectively, to further enhance the sealing effect of the gasket when the first and second bodies engage the compression limiting stop.

* * * * *

UNITED STATES PATENT AND TRADEMARK OFFICE
CERTIFICATE OF CORRECTION

PATENT NO. : 6,318,732 B1
DATED : November 20, 2001
INVENTOR(S) : Hoyes et al.

It is certified that error appears in the above-identified patent and that said Letters Patent is hereby corrected as shown below:

Column 5,
Line 22, change "16." to -- 26. --

Column 6,
Line 66, change "in claim 1 herein" to -- in claim 1 wherein --

Signed and Sealed this

Thirtieth Day of December, 2003

JAMES E. ROGAN
*Director of the United States Patent and Trademark Office*